United States Patent
Yoshiwara

(10) Patent No.: US 8,686,068 B2
(45) Date of Patent: Apr. 1, 2014

(54) POLYMERIZABLE COMPOSITION, CROSS-LINKABLE SHAPED ARTICLE, CROSS-LINKED SHAPED ARTICLE, AND CROSS-LINKED SHAPED ARTICLE COMPOSITE

(75) Inventor: Akihiko Yoshiwara, Tokyo (JP)

(73) Assignee: Zeon Corporation, Tokyo (JP)

( * ) Notice: Subject to any disclaimer, the term of this patent is extended or adjusted under 35 U.S.C. 154(b) by 87 days.

(21) Appl. No.: 13/124,589

(22) PCT Filed: Oct. 16, 2009

(86) PCT No.: PCT/JP2009/067906
§ 371 (c)(1),
(2), (4) Date: Jun. 1, 2011

(87) PCT Pub. No.: WO2010/044461
PCT Pub. Date: Apr. 22, 2010

(65) Prior Publication Data
US 2011/0237718 A1    Sep. 29, 2011

(30) Foreign Application Priority Data
Oct. 17, 2008    (JP) ................................. 2008-269112

(51) Int. Cl.
*C08K 9/00* (2006.01)
*C08K 3/28* (2006.01)

(52) U.S. Cl.
USPC .............. 523/215; 524/484; 525/540; 526/72

(58) Field of Classification Search
USPC .......... 524/484, 428, 612; 526/280, 172, 281, 526/282, 283, 72; 525/540; 523/215
See application file for complete search history.

(56) References Cited

U.S. PATENT DOCUMENTS

| | | | |
|---|---|---|---|
| 5,075,354 A * | 12/1991 | Mitsuuchi et al. | 523/217 |
| 5,338,789 A | 8/1994 | Grosse-Puppendahl et al. | |
| 7,465,773 B2 * | 12/2008 | Kodemura et al. | 526/129 |
| 7,964,685 B2 * | 6/2011 | Yoshiwara et al. | 526/280 |
| 2006/0211809 A1 | 9/2006 | Kodemura et al. | |
| 2007/0286999 A1* | 12/2007 | Dijt et al. | 428/292.1 |
| 2009/0062446 A1* | 3/2009 | Wei et al. | 524/404 |
| 2010/0324247 A1* | 12/2010 | Kojima et al. | 526/281 |

FOREIGN PATENT DOCUMENTS

| | | |
|---|---|---|
| EP | 0 424 628 A1 | 8/1990 |
| EP | 1 535 941 A1 | 6/2005 |
| JP | 3-126732 A | 5/1991 |
| JP | 11-335447 A | 12/1999 |
| JP | 2000-355881 A | 12/2000 |
| JP | 2003-082072 A | 3/2003 |
| JP | 2003-171479 A | 6/2003 |
| WO | 2005/012427 A1 | 2/2005 |
| WO | 2008/081885 A1 | 7/2008 |

OTHER PUBLICATIONS

International Search Report of PCT/JP2009/067906, mailing date Jan. 19, 2010.
Extended European Search Report dated Aug. 6, 2012, issued in corresponding European patent application 09820639.4.

* cited by examiner

*Primary Examiner* — Hannah Pak
(74) *Attorney, Agent, or Firm* — Westerman, Hattori, Daniels & Adrian, LLP

(57) ABSTRACT

A polymerizable composition which contains a cycloolefin monomer, metathesis polymerization catalyst, cross-linking agent, and carbon fiber which is brought into contact in advance with a sizing agent which includes a compound having an unsaturated terminal group and a polar group, a cross-linkable shaped article obtained by polymerizing the polymerizable composition, a cross-linked shaped article obtained by cross-linking the cross-linkable shaped article, and a cross-linked shaped article composite which contains the cross-linked shaped article and other members.

6 Claims, No Drawings

POLYMERIZABLE COMPOSITION, CROSS-LINKABLE SHAPED ARTICLE, CROSS-LINKED SHAPED ARTICLE, AND CROSS-LINKED SHAPED ARTICLE COMPOSITE

TECHNICAL FIELD

The present invention relates to a polymerizable composition, cross-linkable shaped article, cross-linked shaped article, and cross-linked shaped article composite. More particularly, it relates to a polymerizable composition and cross-linkable shaped article which are useful for the production of a cross-linked shaped article and cross-linked shaped article composite which have a high mechanical strength and further have few voids and to a cross-linked shaped article and cross-linked shaped article composite obtained from the same.

BACKGROUND ART

A fiber-reinforced composite material comprised of an epoxy resin or other resin reinforced by glass fiber, carbon fiber, or another high strength and high elasticity fiber (glass fiber-reinforced plastic or carbon fiber-reinforced plastic) is particularly superior in mechanical properties, so is being used in broad applications from fishing rods, golf club shafts, and other sports applications to aerospace applications and general industrial applications. As the method for forming such fiber-reinforced composite materials, the method is known of using an intermediate material called a "prepreg" comprised of a reinforcing fiber impregnated in advance with a resin composition forming a matrix resin to form a sheet.

In this respect, in use of a reinforcing fiber, there are the inconveniences of the material being low in elongation and fragile, the orientation of the fiber being disturbed, and the fiber separating and becoming loose. Further, in general, the bondability with the matrix resin is poor, so in a fiber-reinforced composite material, it is difficult to sufficiently realize the superior properties of the reinforcing fiber. Therefore, in the past, the reinforcing fiber has been treated with a sizing agent. Such a sizing agent is used to improve the handling ability of the reinforcing fiber and, further, improve the bondability with the matrix resin to improve the properties of the fiber-reinforced composite material, so has the functions of improving the ability of the matrix resin to impregnate the reinforcing fiber and, further, improving the bondability of the matrix resin and the reinforcing fiber etc. As such a sizing agent, various ones are known, but for example, Patent Document 1 discloses a sizing agent for carbon fiber which contains a methacryl group and cyclic aliphatic epoxy group. Such a sizing agent contributes to the improvement of the resin impregnability not only for an epoxy resin, but also in particular for an acryl resin, unsaturated polyester resin, vinylester resin, or other radical polymerization type resin and of the bond strength of these resins with the carbon fiber and can give a stable effect of improvement of the physical properties to carbon fiber etc.

On the other hand, Patent Document 2 describes that if such a sizing agent is deposited on carbon fiber, the polymerization of a norbornene-based monomer is obstructed and a semicured state is difficult to achieve when made into a prepreg, furthermore, strength is not manifested even after heating and curing, and a polymer comprised of a norbornene-based monomer with generally little polarity is bonded with carbon fiber by an anchor effect, so it is preferable that there be no intermediate layer made of extra sizing agent between the carbon fiber and the matrix resin constituted by the polymer. Patent Document 2 proposes, for example, to use acetone to wash off the sizing agent so as to reduce the amount of deposition on the carbon fiber to 1 wt % or less, then use the carbon fiber to produce a prepreg. That is, Patent Document 2 teaches that when using a polymer comprised of the generally low polarity norbornene-based monomer as a matrix resin to impregnate carbon fibers to obtain a prepreg for use in producing a fiber-reinforced composite material, the amount of the sizing agent which is deposited on the carbon fiber should be reduced as much as possible.

Further, it is known that when using reinforcing fiber on which a sizing agent is deposited so as to produce a fiber-reinforced composite material, bubbles occur due to the sizing agent at the time of heating and voids are formed in the fiber-reinforced composite material.

PRIOR ART DOCUMENTS

Patent Documents

Patent Document 1: Japanese Patent Publication (A) No. 2000-355881

Patent Document 2: Japanese Patent Publication (A) No. 2003-171479

DISCLOSURE OF THE INVENTION

Problem to be Solved by the Invention

The inventor obtained a fiber-reinforced composite material by curing the prepreg described in Patent Document 2 whereupon it was confirmed that a polymer comprised of a norbornene-based monomer is weak in bondability with carbon fiber and the resultant mechanical strength is still insufficient.

An object of the present invention is to provide a polymerizable composition and cross-linkable shaped article which are useful for production of a cross-linked shaped article and cross-linked shaped article composite which have high mechanical strength and have few voids and a cross-linked shaped article and cross-linked shaped article composite obtained using the same.

Means for Solving the Problems

The inventor engaged in intensive studies to solve the above problem by aiming at the improvement of the bondability and adhesion of a polymer comprised of a norbornene-based monomer and carbon fiber whereupon it is discovered that, contrary to the teaching of Patent Document 2, if using a specific sizing agent, the bondability and adhesion of the polymer and carbon fiber is improved, the mechanical strength of the carbon fiber-reinforced composite material made using the polymer as a matrix resin becomes higher, and further substantially no voids were caused. The inventor completed the present invention based on these discoveries.

That is, the present invention provides:

[1] A polymerizable composition comprised of a cycloolefin monomer, metathesis polymerization catalyst, cross-linking agent, and carbon fiber brought into contact in advance with a sizing agent which includes a compound having an unsaturated terminal group and polar group.

[2] The polymerizable composition as set forth in [1], wherein the cycloolefin monomer includes a cycloolefin monomer which has at least one cross-linkable carbon-carbon unsaturated bond,

[3] The polymerizable composition as set forth in [1] or [2], which further includes a chain transfer agent,

[4] The polymerizable composition as set forth in any one of [1] to [3], wherein the unsaturated terminal group of the sizing agent is a vinyl group and/or vinylidene group and the polar group is an epoxy group and/or isocyanate group,

[5] A cross-linkable shaped article obtained by polymerizing the polymerizable composition as set forth in any one of [1] to [4],

[6] A cross-linked shaped article obtained by cross-linking the cross-linkable shaped article as set forth in claim [5], and

[7] A cross-linked shaped article composite comprised of the cross-linked shaped article as set forth in [6] and other members.

Effects of the Invention

According to the present invention, it is possible to easily obtain a carbon fiber-reinforced prepreg or other cross-linkable shaped article, a shaped article with few voids and superior mechanical strength obtained by cross-linking the prepreg or another cross-linked shaped article, and a laminate of the prepreg with any other member or another cross-linked shaped article composite. The cross-linkable shaped article, cross-linked shaped article, and cross-linked shaped article composite of the present invention can be suitably used as a member for an automobile, aircraft, or other passenger vehicle and further as a member used in the field of sports, civil engineering, construction, etc.

DESCRIPTION OF EMBODIMENTS (Polymerizable Composition)

The polymerizable composition of the present invention includes a cycloolefin monomer, metathesis polymerization catalyst, cross-linking agent, and carbon fiber brought into contact in advance with a sizing agent including a compound having an unsaturated terminal group and a polar group.

(1) Cycloolefin Monomer

The cycloolefin monomer used in the present invention is a compound which has an alicyclic structure which is formed by carbon atoms and has at least one polymerizable carbon-carbon double bond in the alicyclic structure. In this Description, a "polymerizable carbon-carbon double bond" means a carbon-carbon double bond enabling chain polymerization (metathesis ring-opening polymerization).

As an alicyclic structure of a cycloolefin monomer, a monocyclic structure, polycyclic structure, condensation polycyclic structure, bridged ring, and combination polycyclic structures of these, etc. may be mentioned. The number of carbon atoms forming the alicyclic structure is not particularly limited, but usually is 4 to 30, preferably 5 to 20, more preferably 5 to 15.

The cycloolefin monomer may also have an alkyl group, alkenyl group, alkylidene group, aryl group, or other C1 to C30 hydrocarbon group, and carboxyl group, or acid anhydride group or other polar group as a substituent.

As the cycloolefin monomer, it is possible to use either a monocyclic cycloolefin monomer and a polycyclic cycloolefin monomer. From the viewpoint of the heat resistance of the obtained cross-linked shaped article and cross-linked shaped article composite, a polycyclic cycloolefin monomer is preferable. As the polycyclic cycloolefin monomer, in particular a norbornene-based monomer is preferable. A "norbornene-based monomer" means a cycloolefin monomer which has a norbornene ring structure in the molecule. For example, norbornenes, dicyclopentadienes, and tetracyclododecenes, etc. may be mentioned.

In the present invention, as the cycloolefin monomer, any one which does not have a cross-linkable carbon-carbon unsaturated bond and one which has at least one cross-linkable carbon-carbon unsaturated bond is freely used. In this Description, a "cross-linkable carbon-carbon unsaturated bond" means a carbon-carbon unsaturated bond which does not participate in the ring-opening polymerization and can participate in the cross-linking reaction. A "cross-linking reaction" is a reaction which forms a cross-linked structure, condensation reaction, addition reaction, radical reaction, metathesis reaction, or various other reactions, but in the present invention, usually it means a radical cross-linking reaction or metathesis cross-linking reaction, in particular a radical cross-linking reaction. As a cross-linkable carbon-carbon unsaturated bond, a carbon-carbon unsaturated bond other than an aromatic carbon-carbon unsaturated bond, that is, an aliphatic carbon-carbon double bond or triple bond, may be mentioned. In the present invention, it usually means an aliphatic carbon-carbon double bond. The position of the unsaturated bond in the cycloolefin monomer which has at least one cross-linkable carbon-carbon unsaturated bond is not particularly limited. In addition to inside of the alicyclic structure which is formed by the carbon atoms, any position other than the alicyclic structure, for example, the terminal or inside of the side chain, is also possible. For example, the aliphatic carbon-carbon double bond can be present as a vinyl group ($CH_2=CH-$), vinylidene group ($CH_2=C<$), or vinylene group ($-CH=CH-$) and exhibits excellent radical cross-linking ability, so presence as a vinyl group and/or vinylidene group is preferable, while presence as a vinylidene group is more preferable.

As a cycloolefin monomer which does not have a cross-linkable carbon-carbon unsaturated bond, for example, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, or other monocyclic cycloolefin monomer; norbornene, 5-methyl-2-norbornene, 5-ethyl-2-norbornene, 5-propyl-2-norbornene, 5,6-dimethyl-2-norbornene, 1-methyl-2-norbornene, 7-methyl-2-norbornene, 5,5,6-trimethyl-2-norbornene, 5-phenyl-2-norbornene, 1,4,5,8-dimethano-1,2,3,4,4a,5,8,8a-octahydronaphthalene (TCD), 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloro-2-norbornene, 5,5-dichloro-2-norbornene, 5-fluoro-2-norbornene, 5,5,6-trifluoro-6-trifluoromethyl-2-norbornene, 5-chloromethyl-2-norbornene, 5-methoxy-2-norbornene, 5,6-dicarboxyl-2-norbornene anhydrate, 5-dimethylamino-2-norbornene, 5-cyano-2-norbornene, or other norbornene-based monomer;

may be mentioned. Preferably, it is a norbornene-based monomer which does not have a cross-linkable carbon-carbon unsaturated bond.

As the cycloolefin monomer which has at least one cross-linkable carbon-carbon unsaturated bond, for example, 3-vinylcyclohexene, 4-vinylcyclohexene, 1,3-cyclopentadiene, 1,3-cyclohexadiene, 1,4-cyclohexadiene, 5-ethyl-1,3-cyclohexadiene, 1,3-cycloheptadiene, 1,3-cyclooctadiene, or other monocyclic cycloolefin monomer; 5-ethylidene-2-norbornene, 5-methylidene-2-norbornene, 5-isopropylidene-2-norbornene, 5-vinyl-2-norbornene, 5-allyl-2-norbornene, 5,6-diethylidene-2-norbornene, dicyclopentadiene, 2,5-norbornadiene, or other norbornene-based monomer; may be mentioned. Preferably, it is a norbornene-based monomer which has at least one cross-linkable carbon-carbon unsaturated bond.

These cycloolefin monomers can be used alone or in combinations of two or more types.

As the cycloolefin monomer used in the present invention, one including a cycloolefin monomer which has at least one cross-linkable carbon-carbon unsaturated bond is preferable. If using such a cycloolefin monomer, in the obtained cross-linked shaped article or cross-linked shaped article composite, the crack resistance and other aspects of reliability are improved, so this is preferable.

In the cycloolefin monomer which is mixed into the polymerizable composition of the present invention, the mixing ratio of a cycloolefin monomer which has at least one cross-linkable carbon-carbon unsaturated bond and a cycloolefin monomer which does not have any cross-linkable carbon-carbon unsaturated bond is suitably selected, but by weight ratio (cycloolefin monomer which has at least one cross-linkable carbon-carbon unsaturated bond/cycloolefin monomer which does not have any cross-linkable carbon-carbon unsaturated bond) is usually 5/95 to 100/0, preferably 10/90 to 90/10, more preferably 15/85 to 70/30 in range. If the mixing ratio is in that range, in the obtained cross-linked shaped article and the cross-linked shaped article composite, the heat resistance, crack resistance, and other properties are improved to a high degree, so this is preferable.

Note that, the polymerizable composition of the present invention may contain any monomer which can be copolymerized with the above cycloolefin monomer so long as the realization of the effect of the present invention is not inhibited.

(2) Metathesis Polymerization Catalyst

The metathesis polymerization catalyst forming part of the polymerizable composition is not particularly limited so long as causing the cycloolefin monomer to undergo metathesis ring-opening polymerization.

As the metathesis polymerization catalyst, a complex comprised of a center transition metal atom around which ions, atoms, polyatomic ions, and/or compounds are bonded may be mentioned. As the transition metal atom, atoms of Group V, Group VI, and Group VIII (Long Form of the Periodic Table, same below) are used. Which of these groups of atoms to use is not particularly limited, but as atoms of Group V, preferably tantalum may be mentioned, as atoms of Group VI, preferably molybdenum and tungsten may be mentioned, and as atoms of Group VIII, preferably ruthenium and osmium may be mentioned.

Among these as well, use of a complex of ruthenium or osmium of Group VIII as the metathesis polymerization catalyst is preferable, while a ruthenium-carbene complex is particularly preferable. A ruthenium-carbene complex is superior in catalytic activity at the time of bulk polymerization, so it is possible to obtain a cross-linkable resin which is superior in productivity of the cross-linkable resin and is low in the odor derived from residual unreacted monomer. Further, a complex of ruthenium or osmium of Group VIII is relatively stable with respect to oxygen or moisture in the air thereby scarcely deactivating, so the cross-linkable resin can be produced even in the air.

As specific examples of the ruthenium-carbene complex, complexes of the following formula (1) or formula (2) may be mentioned.

(1)

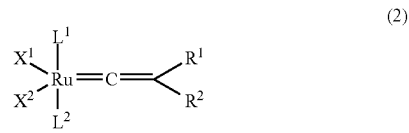

(2)

In formulas (1) and (2), $R^1$ and $R^2$ independently indicate a hydrogen atom, halogen atom, or cyclic or chain C1 to C20 hydrocarbon group which may contain a halogen atom, oxygen atom, nitrogen atom, sulfur atom, phosphorus atom, or silicon atom. $X^1$ and $X^2$ respectively independently indicate an arbitrary anionic ligand. $L^1$ and $L^2$ respectively independently indicate a hetero atom-containing carbene compound or neutral electron donor compound other than a hetero atom-containing carbene compound. Further, $R^1$ and $R^2$ may bond with each other to form an aliphatic ring or aromatic ring which may contain a hetero atom. Furthermore, $R^1$, $R^2$, $X^2$, $L^1$, and $L^2$ may bond together in any combination to form a multidentate chelating ligand.

A "hetero atom" means an atom of Group XV or Group XVI of the Periodic Table. Specifically, a nitrogen atom (N), oxygen atom (O), phosphorus atom (P), sulfur atom (S), arsenic atom (As), selenium atom (Se), etc. may be mentioned. Among these as well, from the viewpoint that a stable carbene compound is obtained, N, O, P, S, etc. are preferable, while N is particularly preferable.

It is preferred that the heteroatom-containing carbene compound has heteroatoms adjacently bonded to both sides of a carbene carbon, and more preferably has a heterocyclic structure formed to contain a carbene carbon atom and heteroatoms located at both sides of the carbene carbon atom. It is additionally preferred that each of the heteroatoms adjacent to the carbene carbon atom has a bulky substituted group.

As the hetero atom-containing carbene compound, a compound of the following formula (3) or formula (4) may be mentioned.

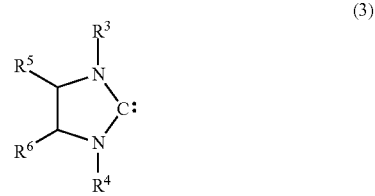

(3)

-continued

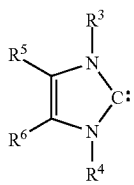
(4)

In formula (3) or formula (4), $R^3$ to $R^6$ independently indicate a hydrogen atom; halogen atom; or a cyclic or chain C1 to C20 hydrocarbon group which may contain a halogen atom, oxygen atom, nitrogen atom, sulfur atom, phosphorus atom, or silicon atom. Further, $R^3$ to $R^6$ may bond with each other in any combination to form a ring.

As the compound expressed by the formula (3) or formula (4), 1,3-dimesitylimidazolydin-2-ylidene, 1,3-di(1-adamantyl)imidazolydin-2-ylidene, 1-cyclohexyl-3-mesitylimidazolydin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, etc. may be mentioned.

Further, in addition to the compound shown by the formula (3) or formula (4), 1,3,4-triphenyl-2,3,4,5-tetrahydro-1H-1,2,4-triazol-5-ylidene, 1,3-dicyclohexylhexahydropyridimidin-2-ylidene, N,N,N',N'-tetraisopropylformamidinylidene, 1,3,4-triphenyl-4,5-dihydro-1H-1,2,4-triazol-5-ylidene, 3-(2,6-diisopropyl phenyl)-2,3-dihydrothiazol-2-ylidene, or other hetero atom-containing carbene compounds may also be used.

In the formula (1) and formula (2), the anionic (negative ionic) ligands $X^1$ and $X^2$ are ligands which have a negative charge when separated from the center metal atoms. For example, a fluorine atom (F), chlorine atom (Cl), bromine atom (Br), iodine atom (I), or other halogen atoms, diketonate group, substituted cyclopentadienyl group, alkoxy group, aryloxy group, carboxyl group, etc. may be mentioned. Among these as well, halogen atoms are preferable, and a chlorine atom is more preferable.

Further, the neutral electron donor compound may be any compound so long as a ligand which has a neutral charge when separated from the center metal. As specific examples, carbonyls, amines, pyridines, ethers, nitriles, esters, phosphines, thioethers, aromatic compounds, olefins, isocyanides, thiocyanates, etc. may be mentioned. Among these as well, phosphines, ethers, and pyridines are preferable, while trialkyl phosphine is more preferable.

As the complex compound expressed by the formula (1), benzylidene(1,3-dimesitylimidazolydin-2-ylidene) (tricyclohexyl-phosphine) ruthenium dichloride, benzylidene(1,3-dimesityl-4,5-dibromo-4-imidazolin-2-ylidene) (tricyclohexylphosphine)ruthenium dichloride, (1,3-dimesityl-4-imidazolin-2-ylidene) (3-phenyl-1H-inden-1-ylidene) (tricyclohexylphosphine)ruthenium dichloride, (1,3-dimesitylimidazolydin-2-ylidene) (3-methyl-2-buten-1-ylidene) (tricyclopentylphosphine)ruthenium dichloride, benzylidene (1,3-dimesityloctahydrobenzimidazole-2-ylidene)(tricyclohexylphosphine) ruthenium dichloride, benzylidene[1,3-di (1-phenylethyl)-4-imidazolin-2-ylidene] (tricyclohexylphosphine)ruthenium dichloride, benzylidene (1,3-dimesityl-2,3-dihydrobenzimidazole-2-ylidene) (tricyclohexylphosphine) ruthenium dichloride, benzylidene(tricyclohexylphosphine) (1,3,4-triphenyl-2,3,4,5-tetrahydro-1H-1,2,4-triazol-5-ylidene)ruthenium dichloride, (1,3-diisopropylhexahydropyridimidin-2-ylidene) (ethoxymethylene)(tricyclohexylphosphine)ruthenium dichloride, benzylidene(1,3-dimesitylimidazolydin-2-ylidene)pyridine ruthenium dichloride, (1,3-dimesitylimidazolydin-2-ylidene)(2-phenylethylidene) (tricyclohexylphosphine)ruthenium dichloride, (1,3-dimesityl-4-imidazolin-2-ylidene) (2-phenylethylidene) (tricyclohexylphosphine) ruthenium dichloride, (1,3-dimesityl-4,5-dibromo-4-imidazolin-2-ylidene)[(phenylthio)methylene] (tricyclohexylphosphine)ruthenium dichloride, (1,3-dimesityl-4,5-dibromo-4-imidazolin-2-ylidene) (2-pyrrolidon-1-ylmethylene) (tricyclohexylphosphine)ruthenium dichloride, and other ruthenium complex compounds comprising a hetero atom-containing carbene compound and a neutral electron donor compound bonded to ruthenium;

benzylidene bis(tricyclohexylphosphine)ruthenium dichloride, (3-methyl-2-buten-1-ylidene)bis(tricyclopentylphosphine)ruthenium dichloride, and other ruthenium compounds comprising two neutral electron donor compounds bonded to ruthenium;

benzylidene bis(1,3-dicyclohexylimidazolydin-2-ylidene) ruthenium dichloride, benzylidene bis(1,3-diisopropyl-4-imidazolin-2-ylidene)ruthenium dichloride, and other ruthenium complex compounds comprising two hetero atom-containing carbene compounds bonded to ruthenium; etc. may be mentioned.

As the complex compound expressed by the formula (2), (1,3-dimesitylimidazolydin-2-ylidene) (phenylvinylidene) (tricyclohexyl-phosphine)ruthenium dichloride, (t-butylvinylidene) (1,3-diisopropyl-4-imidazolin-2-ylidene) (tricyclopentylphosphine)ruthenium dichloride, bis(1,3-dicyclohexyl-4-imidazolin-2-ylidene)phenylvinylidene ruthenium dichloride, etc. may be mentioned.

Among these complex compounds as well, one expressed by the formula (1) and having as a ligand one compound expressed by the formula (4) is most preferable.

These ruthenium-carbene complexes may be produced by the method described in Org. Lett., 1999, vol. 1, page 953, Tetrahedron. Lett., 1999, vol. 40, page 2247, etc.

The amount of use of the metathesis polymerization catalyst is a molar ratio (metal atom in metathesis polymerization catalyst: cycloolefin monomer) of usually 1:2,000 to 1:2,000,000, preferably 1:5,000 to 1:1,000,000, more preferably 1:10,000 to 1:500,000 in range.

The metathesis polymerization catalyst if desired may be used dissolved or suspended in a small amount of an inert solvent. As the solvent, n-pentane, n-hexane, n-heptane, liquid paraffin, mineral spirits, or other chain aliphatic hydrocarbon; cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, cyclooctane, or other alicyclic hydrocarbons; benzene, toluene, xylene, or other aromatic hydrocarbons; nitromethane, nitrobenzene, acetonitrile, or other nitrogen-containing hydrocarbons; diethylether, tetrahydrofuran, or other oxygen-containing hydrocarbons; etc. may be mentioned. Among these, use of industrially generally used aromatic hydrocarbons or aliphatic hydrocarbons or alicyclic hydrocarbons is preferable. Further, so long as not lowering the activity as a metathesis polymerization catalyst, a liquid antiaging agent, liquid plasticizer, or liquid elastomer may also be used as a solvent.

The metathesis polymerization catalyst may be jointly used with an activating agent (co-catalyst) for the purpose of controlling the polymerization activity and improving the polymerization reaction rate. As the activating agent, alkylides, halides, alkoxides, aryloxides of aluminum, scandium, and tin etc. may be mentioned.

As specific examples of the activating agent, trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, tetraalkoxy zirconium, etc. may be mentioned.

The amount of use of the activating agent is a molar ratio (metal atom in metathesis polymerization catalyst:activating agent) of usually 1:0.05 to 1:100, preferably 1:0.2 to 1:20, more preferably 1:0.5 to 1:10 in range.

Further, when using, as the metathesis polymerization catalyst, a complex of a Group V or Group VI transition metal atom, the metathesis polymerization catalyst and activating agent are both preferably used dissolved in the monomer, but if in a range not inherently detracting from the properties of the obtained product, may also be used suspended or dissolved in a small amount of solvent.

(3) Cross-Linking Agent

The cross-linking agent which is used in the present invention is used for the purpose of inducing a cross-linking reaction in a polymer (cycloolefin polymer) which is obtained by subjecting the polymerizable composition of the present invention to a polymerization reaction. Therefore, the polymer becomes a post cross-linkable thermoplastic resin. Here, "post cross-linkable" means the ability of the resin to become a cross-linked resin by progression of a cross-linking reaction by heating. The cross-linkable shaped article of the present invention having the above polymer as a matrix resin melts by heating and is high in viscosity, so holds its shape, while when brought into contact with any member, exhibits moldability at its surface to the shape of that member and finally cross-links to cure. The properties of the cross-linkable shaped article of the present invention are believed to contribute to the improvement of the interlayer adhesion in a laminate obtained for example by laminating the cross-linkable shaped article of the present invention and heating and cross-linking it.

As the cross-linking agent in the present invention, usually a radical generator is used. As the radical generator, for example, an organic peroxide, diazo compound, nonpolar radical generator, etc. may be mentioned. Preferably, it is an organic peroxide or nonpolar radical generator.

As the organic peroxide, for example, t-butyl hydroperoxide, p-mentane hydroperoxide, cumen hydroperoxide, or other hydroperoxides; dicumyl peroxide, t-butylcumyl peroxide, α,α'-bis(t-butylperoxy-m-isopropyl)benzene, di-t-butylperoxide, 2,5-dimethyl-2,5-di(t-butylperoxy)-3-hexine, 2,5-dimethyl-2,5-di(t-butylperoxy)hexane, or other dialkyl peroxides; dipropionyl peroxide, benzoyl peroxide, or other diacyl peroxides; 2,2-di(t-butylperoxy)butane, 1,1-di(t-hexylperoxy) cyclohexane, 1,1-di(t-butylperoxy)-2-methylcyclohexane, 1,1-di(t-butylperoxy)cyclohexane, or other peroxyketals; t-butylperoxy acetate, t-butylperoxy benzoate, or other peroxy esters; t-butylperoxyisopropyl carbonate, di(isopropylperoxy) dicarbonate, or other peroxy carbonates; t-butyltrimethylsilyl peroxide or other alkylsilyl peroxides; 3,3,5,7,7-pentamethyl-1,2,4-trioxepane, 3,6,9-triethyl-3,6,9-trimethyl-1,4,7-triperoxonane, 3,6-diethyl-3,6-dimethyl-1,2,4,5-tetroxane, or other cyclic peroxides may be mentioned. Among these as well, in the point of little obstruction of the polymerization reaction, dialkyl peroxides, peroxyketals, and cyclic peroxides are preferable.

As the diazo compound, for example, 4,4'-bisazidobenzal(4-methyl)cyclohexanone, 2,6-bis(4'-azidobenzal)cyclohexanone, etc. may be mentioned.

As the nonpolar radical generator, 2,3-dimethyl-2,3-diphenylbutane, 3,4-dimethyl-3,4-diphenylhexane, 1,1,2-triphenylethane, 1,1,1-triphenyl-2-phenylethane, etc. may be mentioned.

When using a radical generator as a cross-linking agent, the one-minute half-life temperature is suitably selected by the conditions of curing (cross-linking of the obtained polymer by subjecting the polymerizable composition of the present invention to a polymerization reaction), but is usually 100 to 300° C., preferably 150 to 250° C., more preferably 160 to 230° C. in range. Here, the "one-minute half-life temperature" is the temperature at which half of the radical generator decomposes in one minute. For the one-minute half-life temperature of a radical generator, for example, refer to the catalogs or homepages of the radical generator manufacturers (for example, NOF Corporation).

The radical generator may be used alone or in combinations of two or more types. The amount of the radical generator mixed into the polymerizable composition of the present invention is, with respect to the mixed cycloolefin monomer as 100 parts by weight, usually 0.01 to 10 parts by weight, preferably 0.1 to 10 parts by weight, more preferably 0.5 to 5 parts by weight in range.

Further, in the present invention, to raise the cross-linking density in the obtained cross-linked shaped article, use of a cross-linking aid is preferred. A cross-linking aid is comprised of a polyfunctional compound which has two or more cross-linkable carbon-carbon unsaturated bonds which do not participate in the ring-opening polymerization but can participate in the cross-linking reaction induced by the cross-linking agent. The cross-linkable carbon-carbon unsaturated bonds are preferably present in the compound forming the cross-linking aid as, for example, vinylidene groups present at the molecule terminals, in particular, as isopropenyl groups or methacryl groups, more preferably are present as methacryl groups.

As specific examples of the cross-linking aid, p-diisopropenyl benzene, m-diisopropenyl benzene, o-diisopropenyl benzene, and other polyfunctional compounds having two or more isopropenyl groups; ethylene dimethacrylate, 1,3-butylene dimethacrylate, 1,4-butylene dimethacrylate, 1,6-hexanediol dimethacrylate, polyethyleneglycol dimethacrylate, polyethyleneglycol dimethacrylate, ethyleneglycol dimethacrylate, triethyleneglycol dimethacrylate, diethyleneglycol dimethacrylate, 2,2'-bis(4-methacryloxydiethoxyphenyl)propane, trimethylolpropane trimethacrylate, pentaerythritol trimethacrylate, and other polyfunctional compounds having two or more methacryl groups etc. may be mentioned. Among these as well, as cross-linking aids, polyfunctional compounds having two or more methacryl groups are preferable. Among the polyfunctional compounds having two or more methacryl groups, in particular, trimethylolpropane trimethacrylate and pentaerythritol trimethacrylate and other polyfunctional compounds having three methacryl groups is more preferable.

The cross-linking aids can be used alone or in combinations of two or more types. The amount of the cross-linking aid mixed in the polymerizable composition of the present invention is, with respect to the mixed cycloolefin monomer as 100 parts by weight, usually 0.1 to 100 parts by weight, preferably 0.5 to 50 parts by weight, more preferably 1 to 30 parts by weight.

(4) Sizing Agent

The sizing agent which is used in the present invention contains a compound having an unsaturated terminal group and polar group (below, sometimes called a "compound A").

An "unsaturated terminal group" means an unsaturated group, that is, an aliphatic carbon-carbon double bond group or aliphatic carbon-carbon triple bond group, which are present at the terminal of the molecule of the compound A. The unsaturated terminal group is usually a vinyl group and/or vinylidene group. Due to the superiority in radical cross-linking reactivity, presence as at least one type selected from the group comprised of a vinyl group, acryl group, and methacryl group is preferable. Presence as a vinyl group and/or methacryl group is more preferable. The polar group is not particularly limited so long as able to chemically bond with the surface of carbon fiber. Due to the superiority in reactivity with the hydroxyl groups, carboxyl groups, ketone groups, and other functional groups at the surface of the carbon fiber, at least one type selected from the group comprised of an epoxy group, isocyanate group, oxazoline group, sulfonate group, acid anhydride group, thiol group, mercapto group, oxetane group, lactone group, amide bond, imide bond, urethane bond, and urea bond is preferable, at least one type selected from the group comprised of an epoxy group, isocyanate group, oxazoline group, acid anhydride group, and thiol group is more preferable, and an epoxy group and/or isocyanate group is particularly preferable. In the present invention, due to the superiority in reactivity and compatibility with the matrix resin and reactivity with the surface of the carbon fiber, usually a sizing agent where the unsaturated terminal group is a vinyl group and/or vinylidene group and the polar group is an epoxy group and/or isocyanate group is preferably used.

In the compound A, it is sufficient that there be at least one unsaturated terminal group and polar group. When there are a plurality present, these groups may be comprised of the same types or may be comprised of different types. The numbers of unsaturated groups and polar groups present at the compound A are respectively usually 1 to 100, preferably 1 to 50, more preferably 1 to 10. The compound A may be a monomer or a polymer. The molecular weight of the compound A is not particularly limited, but due to the good permeability among carbon fibers and workability of the obtained carbon fiber bundles, it is usually 100 to 100,000, preferably 100 to 5,000, more preferably 100 to 1,000. The molecular weight of the compound A may be found by gel permeation chromatography (eluant: tetrahydrofuran, polystyrene converted molecular weight).

In the compound A, the vinyl group, vinylidene group, or other unsaturated terminal group participates in the for example radical cross-linking reaction induced by the cross-linking agent and can bond with the polymer obtained by polymerizing the cycloolefin monomer, while the epoxy group or other polar group can react and bond with the carboxyl groups or hydroxyl groups at the surface of the carbon fiber. Through these bonds, the sizing agent can improve the interfacial bondability of the matrix resin constituted by the polymer and the carbon fiber.

As specific examples of the compound A, compounds described in the later explained Example 1 or 2, methacryloxy glycidylether, acryloxy glycidylether, and other compounds having a (meth)acryl group and epoxy group; oxetane acrylate, oxetane methacrylate, and other compounds having a (meth)acryl group and oxetane group; lactone acrylate, lactone methacrylate, and other compounds having a (meth)acryl group and lactone group; vinyl oxazoline, isopropenyl oxazoline, and other compounds having a vinyl group or vinylidene group and oxazoline group; isocyanate methyl acrylate, isocyanate methyl methacrylate, 2-isocyanate ethyl acrylate, 2-isocyanate ethyl methacrylate, and other compounds having a (meth)acryl group and isocyanate group; etc. may be mentioned. In addition, compounds described in the later explained Example 3, methacrylic acid anhydrides, acrylic acid anhydrides, vinyl maleate anhydride, and other compounds having a vinyl group or vinylidene group and acid anhydride group, etc. may be mentioned. Among these as well, due to the excellent reactivity and compatibility with the matrix resin and reactivity with the surface of the carbon fiber, a compound having a (meth)acryl group and epoxy group, a compound having a vinyl group or vinylidene group and an oxazoline group, and a compound having a (meth)acryl group and isocyanate group are preferable, methacryloxy glycidylether, acryloxy glycidylether, isocyanate methyl acrylate, isocyanate methyl methacrylate, vinyloxazoline, 2-isocyanate ethyl acrylate, and 2-isocyanate ethyl methacrylate are more preferable, and isocyanate methyl methacrylate and 2-isocyanate ethyl methacrylate are particularly preferable. Note that, in this Description, "(meth)acryl" means methacryl or acryl.

These compound A may be used alone or in combinations of two or more types. Further, the compound A may be used combined with a conventionally used known sizing agent comprised of a bisphenol A epoxy resin, bisphenol F epoxy resin, epoxy acrylate resin, or other epoxy resin; vinylester resin; urethane resin; polyester resin; or maleated polypropylene or other polypropylene resin. In the sizing agent used in the present invention, the content of the compound A is usually 40 wt % or more, preferably 60 wt % or more.

When bringing the sizing agent into contact with the carbon fiber, it is preferably dispersed or dissolved in water or acetone or another organic solvent and used as a dispersion or solution. In particular, it is preferable to disperse or dissolve the sizing agent in water for use as an aqueous dispersion or aqueous solution because this is superior industrially and from the viewpoint of safety compared with use in a dispersion or solution using an organic solvent as the solvent. The content of the sizing agent in the dispersion or solution of the sizing agent is usually 0.01 to 20 wt %, preferably 0.5 to 10 wt %. When preparing the aqueous dispersion or aqueous solution of the sizing agent, it is preferable to mix in a surfactant to raise the dispersability and improve the solution stability. As this surfactant, a nonionic, cationic, or anionic type may be used. The mixing ratio of the sizing agent and the surfactant is, by weight ratio (sizing agent/surfactant), usually 95/5 to 70/30, preferably 85/15 to 75/25. Furthermore, by mixing a lubricating agent into the dispersion or solution of the sizing agent, it is possible to obtain carbon fiber improved in rubfastness.

The amount of deposition of the sizing agent on the carbon fiber in carbon fiber which has been brought into contact with a sizing agent in advance is, with respect to the total weight of the carbon fiber and sizing agent as 100 wt %, usually 0.1 to 5 wt %, preferably 0.2 to 3 wt %, more preferably 0.5 to 2 wt %. If the amount of deposition is in this range, it is possible to sufficient impart the effect of the sizing agent to the carbon fiber, so this is preferred. That is, suitable bundling ability of the carbon fiber is obtained, the fiber opening ability of the carbon fiber bundles is excellent, and the cycloolefin monomer can be impregnated evenly. Further, a sufficient rubfastness of the carbon fiber is obtained and pilling due to mechanical rubbing etc. is suppressed. Further, the compatibility with the cycloolefin monomer is enhanced, a superior interfacial bonding power is obtained, and the obtained cross-linked shaped article can exhibit excellent dynamic properties.

From the viewpoint of further improving the adhesion between the carbon fiber and matrix resin, it is preferable to ensure the presence of a suitable amount of carboxyl groups, hydroxyl groups, or other active hydrogen-containing groups on the surface of the carbon fiber. The amount of the active hydrogen-containing groups on the surface of the carbon fiber can be quantified by the surface oxygen concentration (O/C) measured by X-ray photoelectron spectroscopy. The amount of the active hydrogen-containing groups on the surface of the carbon fiber is, by O/C, preferably 0.02 or more and 0.2 or less. If in this range, the action of the compound A on the carbon fiber is enhanced and the extent of oxidation of the surface of the carbon fiber is also suitable, so this is preferred. The amount of the active hydrogen-containing groups at the surface of the carbon fiber is, by O/C, more preferably 0.04 to 0.15, more preferably 0.06 to 0.1.

The method of introducing active hydrogen-containing groups to the surface of the carbon fiber is not particularly limited. A usually used method may be suitably employed. There are the ozone method, electrolytic oxidation in an acid solution etc., but an oxidation reaction in a solution is economically superior. At this time, the amount of the active hydrogen-containing group may be suitably adjusted by the amount of current, temperature, residence time in the acidic bath, acidity, etc.

The surface conditions of the carbon fiber are not particularly limited. The surface may be flat or have surface relief. Since an anchor effect can be expected, surface relief is preferable. The extent of this surface relief may be suitably selected. Surface relief may be simultaneously introduced to the surface of the carbon fiber by, for example, changing the current density or controlling the pH of the solution at the time of an oxidation reaction in the solution.

The carbon fiber and the sizing agent may be brought into contact by the roller impregnation method, roller contact method, or other method generally used industrially. The amount of deposition on the sizing agent on the carbon fiber can be adjusted by adjusting the concentration of the dispersion or solution of the sizing agent used or by adjusting the roller squeezing controller or other parts of the running process. The carbon fiber and the sizing agent are usually brought into contact using a dispersion or solution of the sizing agent, so after contact, it is preferable to treat the fiber by a drying step to remove the water or organic solvent contained in the dispersion or solution of the sizing agent. The drying process is performed by a method using hot air, a hot plate, roller, various types of infrared heaters, etc. as the heating medium.

If using the above such sizing agent, the adhesion or bondability of the above polymer forming the matrix resin of the cross-linkable shaped article of the present invention with the carbon fiber is strengthened and the obtained cross-linked shaped article and cross-linked shaped article composite are improved in mechanical strength. Further, when heating the cross-linkable shaped article for cross-linking to obtain a cross-linked shaped article or cross-linked shaped article composite, there are very few bubbles formed due to the sizing agent. Therefore, there are substantially no voids formed in the obtained shaped article etc.

(5) Carbon Fiber

In the present invention, carbon fiber is brought into contact with a sizing agent in advance to deposit sizing agent on its surface, then is used for preparation of the polymerizable composition. That is, the "carbon fiber which has been brought into contact with the sizing agent in advance" means carbon fiber which is brought into contact with a sizing agent before being used for preparation of the polymerizable composition and which has the sizing agent deposited on its surface.

The carbon fiber which is used in the present invention may be comprised of pitch, rayon, lignin, polyacrylonitrile, or any other raw material. Further, the type, for example, may be any type of a high strength type (low elasticity carbon fiber), medium-high elasticity carbon fiber, superhigh elasticity carbon fiber, etc. Furthermore, the form may be any of continuous fiber, staple fiber, woven fabric, knitted fabric, or sheet material and is not particularly limited. As the sheet material, for example, woven cloth, one-directional oriented sheet, nonwoven cloth, mats, etc. or combinations of the same may be mentioned. The weave is not particularly limited. It may be a plain weave, twill weave, satin weave, etc. and also modified forms of these structures. Further, both the warp and weft may use carbon fiber or a mixed spun yarn with fiber other than carbon fiber. As the fiber other than carbon fiber, glass fiber, tyranno fiber, SiC fiber, or other inorganic fiber, aramide, polyester, polypropylene, nylon, acryl, polyimide, vinylon, or other organic fiber etc. may be mentioned. Furthermore, it is possible to use a mixed weave of two or more types of composite fiber and carbon fiber. From the viewpoint of the handling ability of carbon fiber or impregnability of cycloolefin monomer, when using carbon fiber as the warp, it is preferable use a fiber having a tensile modulus of elasticity lower than the carbon fiber as the weft to prepare a sheet material.

(6) Other Additives

The polymerizable composition of the present invention may further contain various types of additives, for example, a filler, chain transfer agent, polymerization reaction retardant, radical cross-linking retardant, reinforcing material, modifying agent, antioxidant, flame retardant, coloring agent, photostabilizer, etc.

As the filler, any known one may be used. The shape is not particularly limited. For example, spherical, amorphous, rod-shaped, plate-shaped, hollow-shaped, and other fillers may be mentioned. Further, the material is not particularly limited.

By mixing a chain transfer agent into the polymerizable composition of the present invention, the moldability at the time of heating and melting at the surface of the cross-linkable shaped article obtained by polymerization of the composition can be improved more. For this reason, for example, in a laminate obtained by stacking cross-linkable shaped articles obtained using a polymerizable composition containing a chain transfer agent and heating them to melt and cross-link, the interlayer adhesion is further improved, so this is preferable. Such a cross-linkable shaped article can for example be melt laminated when stacked with another material.

The chain transfer agent may have at least one cross-linkable carbon-carbon unsaturated bond. As specific examples of the chain transfer agent, 1-hexene, 2-hexene, styrene, vinylcyclohexane, allylamine, ethylvinylether, methylvinylketone, 2-(diethylamine)ethyl acrylate, 4-vinylaniline, and other chain transfer agents which do not have a cross-linkable carbon-carbon unsaturated bond; divinylbenzene, vinyl methacrylate, allyl methacrylate, styryl methacrylate, allyl acrylate, undecenyl methacrylate, styryl acrylate, ethyleneglycol diacrylate, and other chain transfer agents which have one cross-linkable carbon-carbon unsaturated bond; allyltrivinyl silane, allylmethyldivinyl silane, or other chain transfer agents which have two or more cross-linkable carbon-carbon unsaturated bonds, etc. may be mentioned. Among these as well, from the viewpoint of improving the mechanical strength of the obtained cross-linked shaped article, one which has at least one cross-linkable carbon-carbon unsaturated bond is preferable, while one which has one cross-linkable carbon-carbon unsaturated bond is more preferable. Among these chain transfer agents as well, a chain transfer agent which has one vinyl group and one methacryl group is preferable, while vinyl methacrylate, allyl methacrylate, styryl methacrylate, and undecenyl methacrylate, etc. are particularly preferable.

These chain transfer agents may be used alone or may be used in combinations of two or more types. The amount of the chain transfer agent mixed in the polymerizable composition of the present invention is, with respect to the mixed cycloolefin monomer as 100 parts by weight, usually 0.01 to 10 parts by weight, preferably 0.1 to 5 parts by weight.

As the polymerization reaction retardant, for example, triphenyl phosphine, tributyl phosphine, trimethyl phosphine, triethyl phosphine, and other phosphines; aniline, pyridine, and other Lewis bases; may be mentioned. Among these as well, due to the ability to efficiently control the usable time of the polymerizable composition of the present invention and the little obstruction of the polymerization reaction, phosphines are preferred.

Further, among the cycloolefin monomers, a monomer which has a 1,5-diene structure or 1,3,5-triene structure in its molecule also functions as a polymerization reaction retardant. As such a compound, 1,5-cyclooctadiene, 5-vinyl-2-norbornene, etc. may be mentioned.

As the radical cross-linking retardant, alkoxyphenols, catechols, and benzoquinones may be mentioned. 3,5-di-t-butyl-4-hydroxyanisole and other alkoxyphenols are preferable.

As the reinforcing material, glass fiber or another inorganic reinforcing material and a paper base material or aramide fiber or other organic reinforcing material etc. may be mentioned. As a modifying agent, natural rubber, polybutadiene, polyisoprene, styrene-butadiene copolymer (SBR), styrene-butadiene-styrene block copolymer (SBS), styrene-isoprene-styrene copolymer (SIS), ethylene-propylene-diene terpolymer (EPDM), ethylene-vinyl acetate copolymer (EVA), and their hydroxides and other elastomers etc. may be mentioned. As the antioxidant, a hindered phenol based one, phosphorus-based one, amine-based one, or other various types of antioxidants for plasticc and rubbers etc. may be mentioned. These antioxidants may be used alone, but are preferably used in combinations of two or more types.

As the flame retardant, a phosphorus-containing flame retardant, nitrogen-containing flame retardant, halogen flame retardant, aluminum hydroxide or other metal hydroxide flame retardant; antimony trioxide or other antimony compound; etc. may be mentioned. The flame retardant may be used alone, but are preferably used in combinations of two or more types.

As the coloring agent, a dye, pigment, etc. may be used. There are many types of dyes. A known one may be suitably selected and used.

The method of preparation of the polymerizable composition of the present invention is not particularly limited. The polymerizable composition of the present invention usually can be prepared by mixing the ingredients other than the carbon fiber which has been brought into contact with a sizing agent in advance, so as to prepare a preliminary composition and impregnating this by any method in the carbon fiber which has been brought into contact with a sizing agent in advance. The preliminary composition, for example, may be prepared by dissolving or dispersing a metathesis polymerization catalyst in a suitable solvent to prepare a solution (below, sometimes called a "catalyst solution"), separately mixing into a cycloolefin monomer a cross-linking agent plus a filler, flame retardant, or other additives as desired to prepare another solution (below, sometimes called a "monomer solution"), and adding the catalyst solution to the monomer solution and stirring them. The catalyst solution is preferably added immediately before the polymerization reaction. Further, a chain transfer agent, radical cross-linking retardant, etc. may be added to the monomer solution and/or catalyst solution before mixing the monomer solution and catalyst solution or may be added after mixing the monomer solution and the catalyst solution.

(Cross-Linkable Shaped Article)

The cross-linkable shaped article of the present invention is obtained by polymerization of the above polymerizable composition. The polymerization method of the polymerizable composition is not particularly limited, but if considering the production efficiency of the cross-linkable shaped article, usually bulk polymerization is preferable. As the method for bulk polymerization of a polymerizable composition, (i) the method of casting or coating the preliminary composition onto any member, impregnating carbon fiber which has been brought into contact with the sizing agent in advance with the preliminary composition, and performing bulk polymerization, (ii) the method of injecting the preliminary composition in a mold in which carbon fiber which has been brought in contact with a sizing agent in advance has been placed and performing bulk polymerization, (iii) the method of preparing in advance an assembly obtained by impregnating the preliminary composition in carbon fiber which has been brought in contact with a sizing agent in advance and performing bulk polymerization, etc. may be mentioned.

According to the method of (i), a cross-linkable shaped article composite comprised of a cross-linkable shaped article and other member is obtained. The "other member" in this Description means a member other than the cross-linkable shaped article or cross-linked shaped article of the present invention. In the method of (i), the other member can function as a support member. As that member, one made of polyethylene terephthalate, polypropylene, polyethylene, polycarbonate, polyethylene naphthalate, polyarylate, nylon, or another resin; iron, stainless steel, copper, aluminum, nickel, chrome, gold, silver, or another metal material; etc. may be mentioned. The shape is not particularly limited, but use of a metal foil or resin film is preferred. For example, when using copper foil as the other member, the obtained cross-linkable shaped article composite can be suitably used for production of an electromagnetic wave shielding member superior in electromagnetic wave shielding ability. The thickness of the metal foil or resin film, from the viewpoint of the workability etc., is usually 1 to 150 μm, preferably 2 to 100 μm, more preferably 3 to 75 μm. The surface of the member is preferably smooth. Further, the surface of the metal foil is preferably treated by a known method such as oxidation by plasma etc., blackening or other chemical treatment, treatment by a silane coupling agent or other coupling agent, or other known method.

The method of casting or coating the preliminary composition over the member is not particularly limited, but the spray coating method, dip coating method, roll coating method, curtain coating method, die coating method, slit coating method, or other known coating method may be mentioned. The preliminary composition may be impregnated in the carbon fiber by placing the carbon fiber on a member on which the preliminary composition is coated, placing a protective film over it if desired, then pressing from above by a roller etc.

The bulk polymerization is started by heating the polymerizable composition up to the temperature at which the metathesis polymerization catalyst functions. The method of heating the polymerizable composition to a predetermined temperature is not particularly limited. The method of heating by placing the composition on a hot plate, the method of heating while applying pressure using a press machine (hot press), the method of pressing by heated rollers, the method of using a heating oven, etc. may be mentioned.

The thickness of the layer comprised of the cross-linkable shaped article obtained above is usually 15 mm or less, preferably 10 mm or less, more preferably 5 mm or less.

According to the method of (ii), any shape of cross-linkable shaped article can be obtained. As the shape, a sheet shape, film shape, column shape, cylindrical shape, polygonal columnar shape, etc. may be mentioned.

As the mold used here, a conventionally known mold, for example, a split mold structure, that is, a mold having a core mold and a cavity mold, may be mentioned. Carbon fiber is placed in the cavity in advance, then the preliminary composition is injected and bulk polymerization is caused. The core mold and the cavity mold are fabricated so as to form a cavity matching the shape of the targeted finished product. Further, the shape, material, size, etc. of the mold are not particularly limited. Furthermore, by preparing glass plate, metal plate, or other plate shaped molds and spacers of a predetermined thickness and placing the carbon fiber in the space formed by two plate-shaped molds straddling the spacers, then injecting the preliminary composition, it is possible to obtained a sheet-shaped or film-shaped cross-linkable shaped article.

The charging pressure (filling pressure) when filling the preliminary composition in the mold cavity is usually 0.01 to 10 MPa, preferably 0.02 to 5 MPa. If the filling pressure is too low, the transfer of the transfer surface formed at the inner circumference of the cavity tends to not to be performed well, while if the filing pressure is too high, it is necessary to raise the rigidity of the mold, which is not economical. The mold clamping pressure is usually 0.01 to 10 MPa in range.

The method of (iii) is suitably used for obtaining a sheet-shaped or film-shaped prepreg. For example, the preliminary composition is impregnated in the carbon fiber by coating a predetermined amount of the preliminary composition on the carbon fiber by the spray coating method, dip coating method, roll coating method, curtain coating method, die coating method, slit coating method, or other known method, placing a protective film on top if desired, and pressing the assembly from the top side by a roller etc. By impregnating the preliminary composition in the carbon fiber, then heating the impregnated fiber to a predetermined temperature, it is possible to cause bulk polymerization of the polymerizable composition and obtain the desired prepreg.

In each of the methods of the above (i), (ii), and (iii), the heating temperature for causing bulk polymerization of the polymerizable composition is usually 50 to 250° C., preferably 80 to 200° C., more preferably 90 to 150° C. in range and usually the one-minute half-life temperature of a radical generator or less, preferably 10° C. or more below the one-minute half-life temperature, more preferably 20° C. or more below the one-minute half-life temperature. Further, the polymerization time may be suitably selected, but usually is 10 seconds to 60 minutes, preferably within 20 minutes. By heating the polymerizable composition under such conditions, a cross-linkable shaped article with little unreacted monomer is obtained, so this is preferred.

In the cross-linkable shaped article obtained in this way, the content of the carbon fiber is usually 10 to 90 wt %, preferably 20 to 80 wt %, more preferably 30 to 70 wt % in range. If in this range, the obtained cross-linked shaped article composite is excellent in the balance of the mechanical strength and shapeability, so this is preferred.

The preliminary composition used in the present invention is lower in viscosity compared with the polymer varnish conventionally used for the production of a prepreg, which is comprised of an epoxy resin etc. dissolved in a solvent, and is superior in impregnability in carbon fiber, so the resin obtained by polymerization can be made to uniformly impregnate the carbon fiber base material. The polymer forming the above resin substantially does not have a cross-linked structure and, for example, can be dissolved in toluene. The molecular weight of that polymer is, by polystyrene converted weight average molecular weight measured by gel permeation chromatography (eluant: tetrahydrofuran), usually 1,000 to 1,000,000, preferably 5,000 to 500,000, more preferably 10,000 to 100,000 in range.

Further, usually, the polymerizable composition has little content of solvents etc. not participating in the reaction, so does not require steps such as removal of solvent after impregnation in carbon fiber. It is excellent in productivity. There is therefore resistance to odor, blistering, etc. due to residual solvent in the obtained cross-linkable shaped article etc.

The cross-linkable shaped article of the present invention is a carbon fiber-reinforced resin shaped article having a post cross-linkable thermoplastic resin, including a cross-linking agent, as a matrix resin. Further, the cross-linkable shaped article composite is a composite material of the cross-linkable shaped article and the other member.

The cross-linkable shaped article of the present invention is obtained by causing the polymerization reaction of the polymerizable composition to end completely, so there is little residual monomer and the work environment is not degraded by odor derived from the monomer etc. Further, if using a cross-linking agent, in particular a radical generator, with a high decomposition temperature, at the time of cross-linking, the resin forming the cross-linkable shaped article will suitably flow and adhesion with a metal or other member will become better.

The cross-linkable shaped article of the present invention may also have part of its component resin cross-linked. For example, when performing bulk polymerization of the polymerizable composition in the mold, at the center part in the mold, sometimes dissipation of the heat of the polymerization reaction is difficult, so part of the inside of the mold becomes too high in temperature. At the high temperature part, a cross-linking reaction occurs and cross-linking results. However, if the surface part where heat easily dissipates is formed by a cross-linkable resin of a post cross-linkable type, the effect of the cross-linkable shaped article of the present invention can be sufficiently enjoyed. In the cross-linkable shaped article composite as well, similarly, part of the resin forming the cross-linkable shaped article may also be cross-linked.

The cross-linkable shaped article of the present invention is obtained by polymerization proceeding substantially completely. There is no concern of a further polymerization reaction proceeding during storage. The cross-linkable shaped article of the present invention contains a radical generator or other cross-linking agent, but so long as not heating to the temperature causing a cross-linking reaction or more, no inconveniences such as changes in surface hardness occur and the storage stability is excellent.

The cross-linkable shaped article of the present invention is, for example, preferably used as a prepreg suitable for the production of the cross-linked shaped article and laminate or other cross-linked shaped article composite of the present invention.

(Cross-Linked Shaped Article and Cross-Linked Shaped Article Composite)

The cross-linked shaped article of the present invention is comprised of the above cross-linkable shaped article cross-linked. The cross-linkable shaped article can be cross-linked by maintaining it at the temperature at which the cross-linkable resin (polymer of cycloolefin monomer) forming the cross-linkable shaped article of the present invention undergoes a cross-linking reaction or more. The heating temperature is usually the temperature at which a cross-linking reaction is induced by the cross-linking agent or more. For example, when using a radical generator as the cross-linking agent, usually the temperature is the one-minute half-life temperature or more, preferably a temperature at least 5° C. higher than the one-minute half-life temperature, more preferably a temperature at least 10° C. higher than the one-minute half-life temperature. Typically it is 100 to 300° C., preferably 150 to 250° C. in range. The heating time is 0.1 to 180 minutes, preferably 0.5 to 120 minutes, more preferably 1 to 60 minutes in range.

If cross-linking the cross-linkable shaped article composite obtained by the method of (i), a cross-linked shaped article composite which is comprised of a cross-linked shaped article and other member is obtained. Further, when the cross-linkable shaped article is a sheet-shaped or film-shaped article, two or more of the shaped articles may be stacked and furthermore any other member may be stacked as desired and the assembly hot pressed to obtain a cross-linked shaped article and thereby obtain a cross-linked shaped article composite comprised of a laminate. The pressure at the time of hot pressing is usually 0.5 to 20 MPa, preferably 3 to 10 MPa. The hot pressing may be performed in a vacuum or reduced pressure atmosphere. The hot pressing may be performed by a known press machine having a sheet forming press mold or a press forming machine for sheet mold compounds (SMC) or bulk mold compounds (BMC). Note that, by maintaining the polymerizable composition of the present invention at the temperature at which the cross-linkable shaped article cross-links or more, specifically, by heating at the temperature and time described here, it is possible to make the bulk polymerization of the cycloolefin monomer and the cross-linking reaction in the cycloolefin polymer obtained by this polymerization proceed together to produce the cross-linked shaped article of the present invention.

Furthermore, it is also possible to place the cross-linkable shaped article of the present invention in a mold, then inject any thermoplastic resin into the mold to bring the shaped article and the thermoplastic resin into contact, and in that state cross-link the cross-linkable shaped article in the mold to obtain a cross-linked shaped article composite which has a layer comprised of the cross-linked shaped article and a layer comprised of the thermoplastic resin. The cross-linkable shaped article may also be suitably used stacked. As the thermoplastic resin, for example, polyethylene terephthalate; polybutylene terephthalate; polyethylene naphthalate; liquid crystal polyester, or other polyesters; polyethylene, polypropylene, polybutylene, or other polyolefins; polystyrene; polyoxymethylene; polyamide; polycarbonate; polymethylene methacrylate; polyimide; polyetherimide; polyether ketone; polyether ether ketone; and polysulfone; and other known thermoplastic resins may be mentioned. As the mold, for example, the above molds can be used. The heating conditions for making the cross-linkable shaped article cross-link are similar to the ones above. In this embodiment, when cross-linking the cross-linkable shaped article to cross-link it together with a thermoplastic resin, it is preferable to insert the cross-linkable shaped article into the mold, warm it to a temperature of at least the glass transition temperature of the cycloolefin polymer forming part of the shaped article, and plasticize the shaped article surface in advance. The glass transition temperature of the cycloolefin polymer can be found in accordance with the method described in the later explained section of (4) Heat Resistance. The cross-linkable shaped article of the present invention is comprised of a cycloolefin polymer comprised of a post cross-linkable thermoplastic resin, so at the time of cross-linking, it is believed the cycloolefin polymer is heated once to melt, the cross-linkable shaped article and the thermoplastic resin also in a molten state fuse at the contact interface, and strong adhesion is obtained. The obtained cross-linked shaped article composite becomes extremely superior in mechanical strength and impact resistance.

The cross-linked shaped article and cross-linked shaped article composite of the present invention are superior in electrical insulation, mechanical strength, heat resistance, and dielectric properties. Further, the cross-linked shaped article composite is superior in bondability of the cross-linked shaped article with other members and can be preferably used as an electrical material.

EXAMPLES

Below, examples and comparative examples will be used to explain the present invention in further detail, but the present invention is not limited to these examples. Note that the parts and % in the examples and comparative examples are based on weight unless particularly indicated to the contrary.

The properties in the examples and comparative examples were measured and evaluated by the following methods.
(1) Voids A single 100 mm square laminate was examined visually at its surface and evaluated by the following criteria.
  Good: Three or less voids
  Poor: Four or more voids
(2) Impregnability A laminate was split into two, its cross-section was polished, that cross-section was examined by a scan type electron microscope (SEM), and whether resin impregnated the inside of the bundles of carbon fiber was evaluated by the following criteria.
  Good: No not yet impregnated parts
  Poor: Unimpregnated parts present
(3) Bending Strength A method based on JIS K7074 was used to measure the bending strength of the laminate.
  Very good: Bending strength of 550 Mpa or more
  Good: Bending strength of 500 Mpa to less than 550 Mpa
  Fair: Bending strength of 400 Mpa to less than 500 Mpa
  Poor: Bending strength of less than 400 Mpa
(4) Heat Resistance A booklet shaped test piece (thickness 250 μm, width 5 mm×length 45 mm) was cut out from the laminate and used as the measurement-use test piece. The test piece was subjected to measurement by a dynamic viscoelasticity tester (Model: EXSTAR DMS6100, made by Seiko Instruments) and the glass transition temperature (Tg) was found from the peak value of the tan δ. The higher the Tg, the higher the heat resistance of the laminate and therefore the more preferable.
(5) Sizing Agent Deposition Rate The sizing agent deposition rate of the carbon fiber was measured in accordance with the sizing agent deposition rate test of JIS R 7601.

Below, the sizing agent and the carbon fiber were brought into contact by impregnating a carbon fiber fabric with no sizing agent with a sizing agent solution by roller, then drying this by hot air at 140° C. for 5 minutes to thereby obtain a carbon fiber fabric with sizing agent deposited on it. Note that, the carbon fiber fabric with no sizing agent was obtained by immersing, in a sufficient amount of acetone for removal of the sizing agent, a commercially available carbon fiber fabric with sizing agent deposited on it (flat weave cloth having 200 g/m² basis weight; corresponding to HTS40 3K, WA-310A, made by Toho Tenax) at room temperature (25° C.) for 24 hours, then taking out the fabric from the acetone and drying it at 80° C. for 5 hours. The obtained carbon fiber fabric had a sizing agent deposition rate of less than 0.1%.

Example 1

As the sizing agent solution, one comprised of a compound of the following formula:

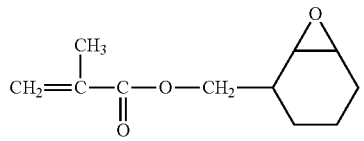

("M-100", made by Daicel Chemical Industries, LTD.) in which a nonionic surfactant is mixed in 20% and diluted by water to prepare a 2% aqueous emulsion solution was used. This sizing agent solution was used to obtain a carbon fiber fabric with sizing agent deposited on it.

In a glass flask, benzylidene(1,3-dimethyl-4-imidazolydin-2-ylidene) (tricyclohexylphosphine)ruthenium dichloride in 51 parts and triphenylphosphine in 79 parts were dissolved in toluene in 952 parts to prepare a catalyst solution.

In a polyethylene bottle, cycloolefin monomers of dicyclopentadiene in 80 parts and tetracyclo[6.2.1.1$^{3,6}$.0$^{2,7}$]dodec-4-ene (TCD) in 20 parts were charged. To this, a chain transfer agent of allyl methacrylate in 0.74 part and a cross-linking agent of di-t-butyl peroxide (one-minute half-life temperature 186° C.) in 1.2 part were added and mixed. Next, the above catalyst solution was added and stirred at a rate of 0.12 ml per 100 g of the cycloolefin monomers to prepare a preliminary composition.

Next, this preliminary composition in 100 parts was cast over a polyethylene naphthalate film (Type Q51, thickness 75 μm, made by Teijin Film), a carbon fiber fabric with the sizing agent deposited on it was laid over this, and the preliminary composition in 80 parts was cast over this. Over that, furthermore, a polyethylene naphthalate film was placed and a roller was used to make the preliminary composition seep into the carbon fiber fabric as a whole. Next, this was allowed to stand in a heating oven which was heated to 95° C. for 1 minute to cause the polymerizable composition to polymerize by bulk polymerization and obtain a thickness 0.25 mm prepreg (cross-linkable shaped article).

This prepreg was cut into 100 mm square sizes and the polyethylene naphthalate film was peeled off. Eight of these were stacked and hot pressed by a hot press by 3 MPa at 200° C. for 15 minutes to prepare a laminate of stacked cross-linked shaped articles. The obtained laminate was evaluated for voids, impregnability, bending strength, and heat resistance. The results are shown in Table 1.

Further, five of the obtained prepregs were stacked up and molded by a spherical mold having a curvature of 202 mm, a height of 4 mm, and a radius of the projecting surface of 80 mm. The molding was performed by placing the prepregs in a mold, heating them to 150° C. for 2 minutes, then closing the mold and pressing them by 3 MPa while raising the temperature to 200° C., holding them at 200° C. for 15 minutes, then cooling and taking out the obtained laminate. The appearance of the obtained laminate was visually examined, whereupon the absence of voids, disturbed fiber, and cracks was confirmed.

Furthermore, five of the obtained prepregs were stacked up and pressed by a hot press at 3 MPa and 150° C. for 2 minutes to obtain a first laminate comprised of stacked cross-linkable shaped articles. This first laminate was placed in a sheet fabrication mold designed for a thickness of 2 mm, the mold was raised in temperature to 150° C., the surface of the laminate was plasticized, then the mold was injected and filled with polypropylene (F109V, made by Prime Polymer). Furthermore, the mold was heated to 200° C. and held there for 5 minutes to make the cross-linkable shaped articles forming the first laminate cross-link, then the temperature was cooled down to room temperature to prepare a resin laminate board of 100 mm square and a thickness of 2 mm comprised of polypropylene and a laminate of cross-linked shaped articles bonded together. The interface between the part comprised of the first laminate and the polypropylene layer was examined visually, whereupon it was confirmed there were no voids or cracks.

Example 2

Except for using as the sizing agent a compound of the following formula:

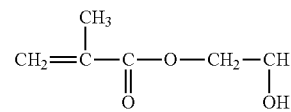 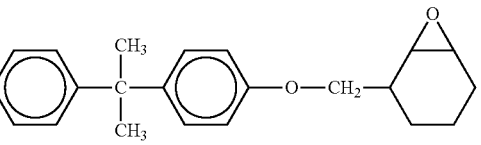

the same procedure was followed as in Example 1 to obtain and evaluate a laminate. The results are shown in Table 1.

Example 3

Except for using as the sizing agent 1,2-epoxy-5-hexene, the same procedure was followed as in Example 1 to obtain and evaluate a laminate. The results are shown in Table 1.

Example 4

Except for making the amount of deposition of the sizing agent 3%, the same procedure was followed as in Example 1 to obtain and evaluate a laminate. The results are shown in Table 1.

Example 5

As the sizing agent, 2-isocyanate ethyl methacrylate was used. This was diluted by toluene to prepare a 5% solution. Except for using this solution, the same procedure was followed as in Example 1 to obtain and evaluate a laminate. The results are shown in Table 1. Further, the same procedure was followed as in Example 1 to obtain and evaluate a resin laminate board, whereupon it was confirmed there were no voids or cracks at the interface of the part comprised of the first laminate and the polypropylene layer.

Comparative Example 1

Except for using the above commercially available carbon fiber fabric as it was, the same procedure was followed as in Example 1 to obtain and evaluate a laminate. The results are shown in Table 1. Note that the sizing agent was bisphenol A type epoxy.

Comparative Example 2

Except for using a carbon fiber fabric without a sizing agent obtained in the same way as above by using the above commercially available carbon fiber fabric, the same procedure was followed as in Example 1 using a carbon fiber fabric without a sizing agent obtained in the same way as above. The results are shown in Table 1.

TABLE 1

|  | Voids | Impregnation ability | Bending strength* | Tg | Sizing agent deposition rate |
|---|---|---|---|---|---|
| Examples 1 | Good | Good | Good (509) | 156 | 1% |
| Examples 2 | Good | Good | Very Good (550) | 153 | 1% |
| Examples 3 | Good | Good | Fair (410) | 151 | 1% |
| Examples 4 | Good | Good | Good (510) | 156 | 3% |
| Examples 5 | Good | Good | Very Good (630) | 160 | 1% |
| Comparative Example 1 | Poor | Poor | Poor (390) | 150 | 1% |
| Comparative Example 2 | Poor | Good | Poor (398) | 151 | <0.1% |

*Features in parentheses indicate actually measured values (unit: MPas)

From Table 1, it is learned that the laminates obtained in Examples 1 to 5 are substantially free of occurrence of voids, have resin uniformly impregnated in the carbon fiber fabric, and have practically sufficient bending strength. In the laminates obtained in Examples 2 and 5, compared with the other examples, it was learned that the bending strength of the laminate is sufficient. As opposed to this, in Comparative Example 1, which uses carbon fiber to which a sizing agent other than the sizing agent which is used in the present invention is deposited, all of the points of evaluation of the laminate are inferior. Further, in Comparative Example 2, which uses carbon fiber from which the sizing agent is substantially removed, it is learned that the impregnability is good, but voids occur and the bending strength is also inferior.

The invention claimed is:

1. A polymerizable composition comprised of a cycloolefin monomer, metathesis polymerization catalyst, cross-linking agent, and carbon fiber brought into contact in advance with a sizing agent which includes a compound having an unsaturated terminal group and polar group,
   wherein the compound is selected from the group consisting of isocyanate methyl acrylate, isocyanate methyl methacrylate, 2-isocyanate ethyl acrylate, and 2-isocyanate ethyl methacrylate, and the cycloolefin monomer includes a cycloolefin monomer which has at least one cross-linkable carbon-carbon unsaturated bond.

2. The polymerizable composition as set forth in claim 1, which further includes a chain transfer agent.

3. A cross-linkable shaped article obtained by polymerizing the polymerizable composition as set forth in claim 1.

4. A cross-linked shaped article obtained by cross-linking the cross-linkable shaped article as set forth in claim 3.

5. A cross-linked shaped article composite comprised of the cross-linked shaped article as set forth in claim 4 and other members.

6. The polymerizable composition as set forth in claim 1, wherein the compound is 2-isocyanate ethyl methacrylate.

* * * * *